Feb. 14, 1967  C. A. CONNELL  3,304,143
SEAT MOUNTED CONTAINER
Filed Aug. 10, 1965  2 Sheets-Sheet 1
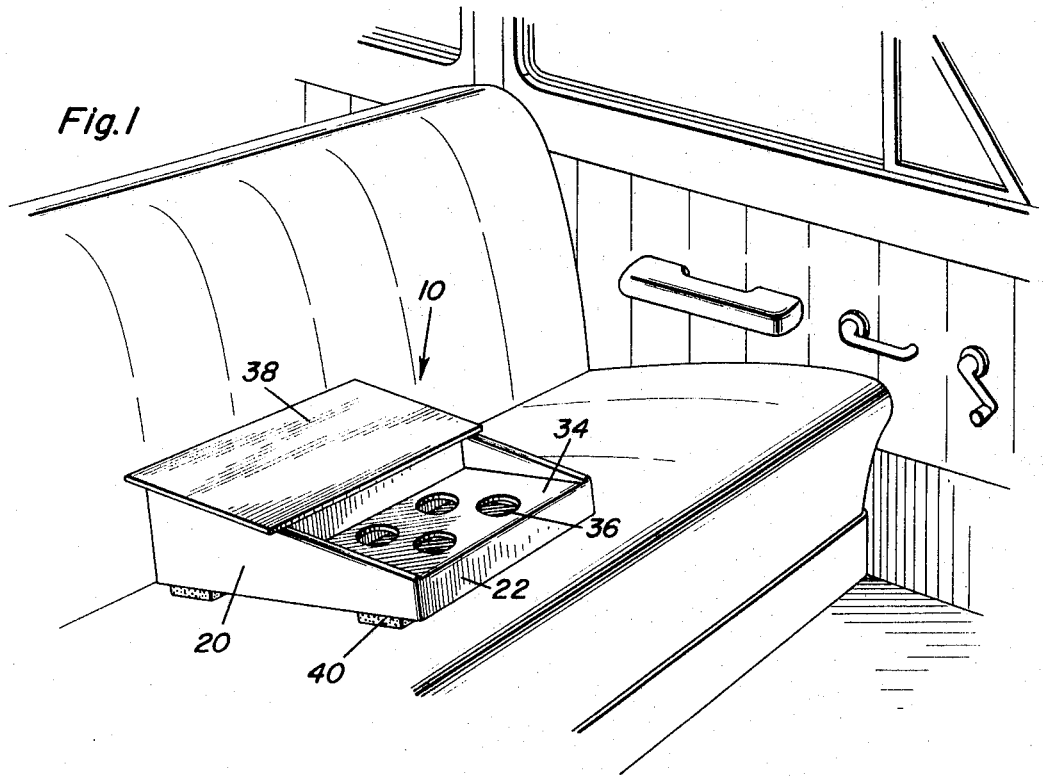
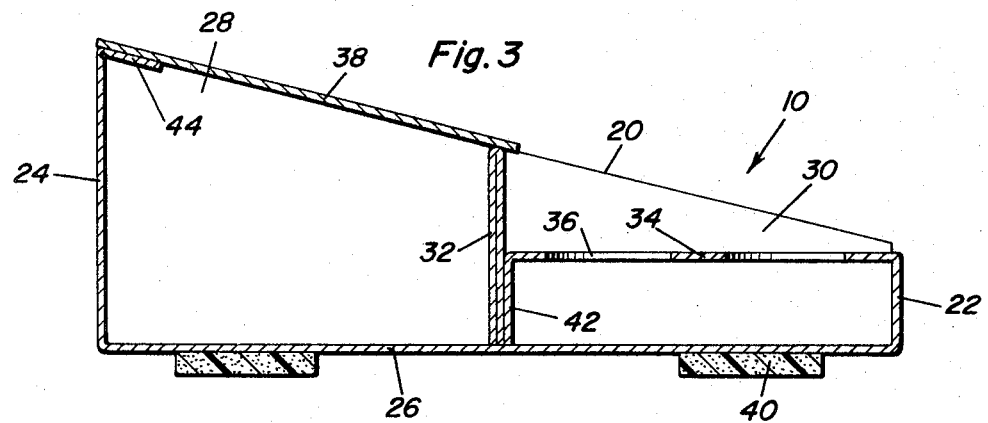
Clyde A. Connell
INVENTOR.

Feb. 14, 1967  C. A. CONNELL  3,304,143
SEAT MOUNTED CONTAINER
Filed Aug. 10, 1965  2 Sheets-Sheet 2
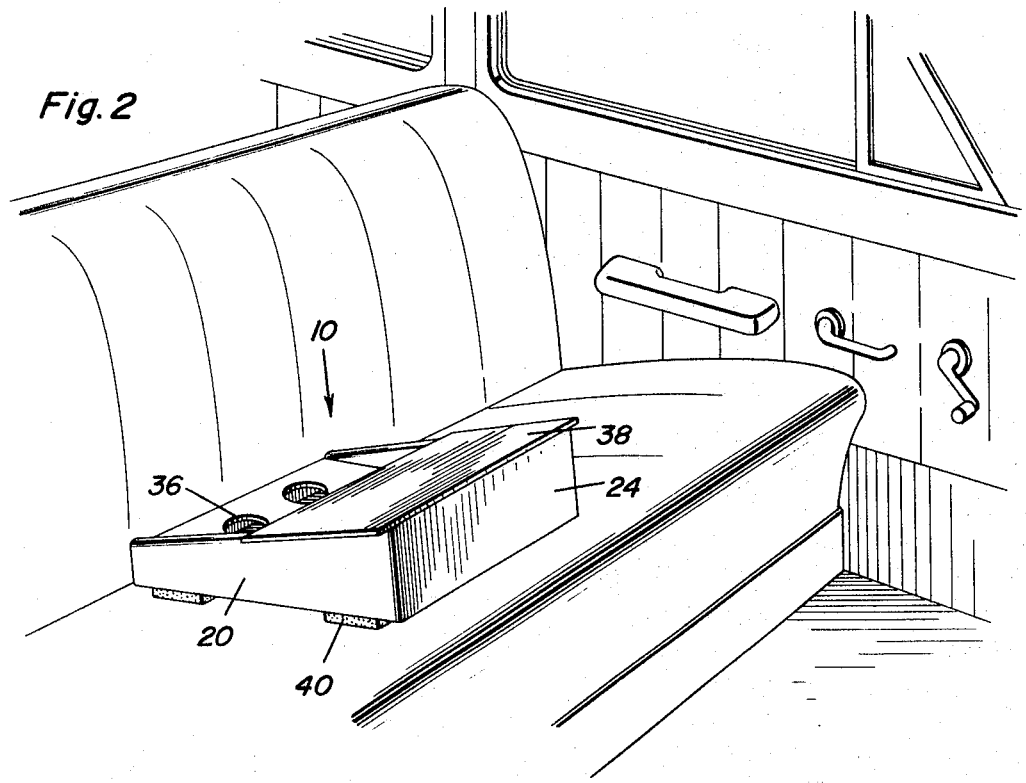
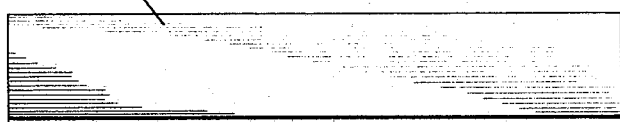
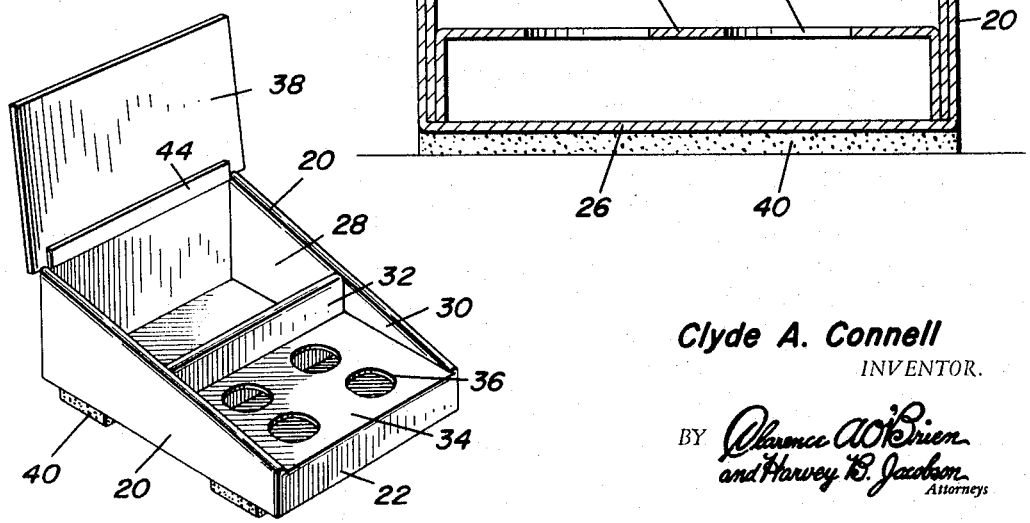
Clyde A. Connell
INVENTOR.

3,304,143
SEAT MOUNTED CONTAINER
Clyde A. Connell, Tyler, Tex., assignor to
James W. Fair, Tyler, Tex.
Filed Aug. 10, 1965, Ser. No. 478,686
3 Claims. (Cl. 312—231)

The present invention relates to an automobile accessory, and is more particularly concerned with an article receptacle or container which is positioned upon the automobile seat.

It is a primary object of the instant invention to provide a combination unit which, through the unique construction thereof, is capable of performing multiple functions. In conjunction with the above object, it is intended that the container of the instant invention provide a storage or litter compartment, a drink and food receiving tray, and a desk forming inclined portion.

Another significant object of the instant invention is to provide a compact inexpensive unit of a size so as to be conveniently positioned on either the front or rear seat between two occupants of the vehicle, the lower surface of the container incorporating means for fixing the container to the support surface of the seat against movement therealong.

Another object of the instant invention is to provide a seat mounted container which, through the unique shape thereof, is particularly adapted to be formed of semi-rigid foldable material such as cardboard.

Basically, in order to achieve the above objects, the container of the instant invention is to incorporate a pair of laterally spaced side walls tapering from a short front wall to a substantially taller rear wall in conjunction with a transverse centrally located partition dividing the basic rectangular shape into a lid closed rear receptacle and a front tray receiving compartment, the front compartment having a plurality of cup or bottle receiving apertures whereby open beverage containers might be safely supported. The lid on the receptacle portion of the container follows the inclination of the side walls, thereby providing a convenient inclined writing surface upon a reversing of the container itself on the automobile seat. The bottom of the container is to have one or more slip resistant pads secured thereto so as to assist in stabilizing the container in position on the vehicle seat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view of the interior of a vehicle illustrating the container of the instant invention mounted on the vehicle seat;

FIGURE 2 is a view similar to FIGURE 1 with the container reversed for use as a writing desk;

FIGURE 3 is an enlarged longitudinal cross-sectional view through the container;

FIGURE 4 is an enlarged transverse cross-sectional view through the container; and FIGURE 5 is a reduced perspective view of the container with the receptacle compartment lid opened.

Referring now more specifically to the drawings, reference numeral 10 is used to generally designate the container comprising the instant invention. This container 10 includes a pair of opposed laterally spaced side walls 20 tapering upwardly from a relatively low interconnecting rectangular front wall 22 to an enlarged interconnecting rectangular rear wall 24 which in turn parallels the front wall 22 so as to define a rectangular unit. An enlarged rectangular one-piece bottom 26 is also provided so as to define a support surface for objects to be placed within the container 10.

The interior of the container 10 is divided into a rear storage or litter compartment 28 and a front food or serving compartment 30 by a centrally located transversely extending partition wall 32. The front food compartment 30 includes a horizontal tray or platform 34 extending rearwardly from the upper edge of the front wall 22 and paralleling the bottom 26. This tray 34 terminates at the intermediate partition wall 32 and includes several cup or bottle receiving apertures 36 therethrough. As will be appreciated, these apertures or openings 36 will receive and stabilize open cups, bottles or cans which in turn will rest on the bottom 26 directly therebelow. Further, the gradually increasing height of the side walls 20 relative to the tray or platform 34 will also function so as to receive and retain other foods on the tray 34, such as for example sandwiches, paper plates, etc.

The litter compartment 38 includes a lid or top 38 hinged to the upper edge of the rear wall 24 for allowing a selective opening thereof in the manner illustrated in FIGURE 5. This lid, when closed, overlies and parallels the upper edges of the side walls 20 so as to be orientated on a similar incline. In this manner, there will be no tendency for the container 10 to obstruct the free movement of the right arm of the driver should the container be positioned next to him. Further, with reference to FIGURE 2, it will be appreciated that upon a reversing of the container on the seat, a highly convenient inclined writing top or desk is provided by the closed lid 38, thus enabling the occupants of the seat to take notes, etc.

In order to restrict any tendency for the container 10 to move on the seat, one or more slide resistant pads 40 are fixed to the bottom 26 and depend therefrom for engagement with the seat surface. Incidentally, the height of these pads 40 can be varied so as to change the level of the seated container 10 as desired.

While the container 10 can be made of any suitable material such as molded Styrofoam or plastic, wood or metal, it is preferably to be made of a relatively stiff cardboard, of the type normally incorporating a central corrugated layer, with the lid 38 being of Masonite or the like. With reference to FIGURE 3, it will be noted that one basic manner of forming the container 10 of sheet cardboard consists of folding the forward portion of the bottom 26 upwardly so as to define the front wall 22, rearwardly so as to define the platform or tray 34 and then downwardly so as to define the supporting flange 42 positioned flush against the double walled partition 32. The rear portion of the bottom 26 is folded upwardly so as to form the rear wall 24 with the upper portion of the rear wall 24 including an integral tongue 44 thereon which is affixed, generally by adhesive, to the inner or bottom face of the Masonite lid 38. It will be noted that this tongue 44 is of a reduced width relative to the rear wall 24 in order that it might be received completely between the two side walls 20, thereby enabling the lid 38 to engage flush against the upper edges of the side walls 20 along the full extent of the lid 38. The actual hinging effect is provided by crimping or compressing the cardboard at the base of the tongue 44, thus allowing the full width of this portion to function as a single elongated hinge.

With reference to FIGURE 4, it will be noted that the opposite sides of the bottom 26 are initially folded upwardly and then reversed upon themselves so as to form double side walls which introduce a substantial degree of rigidity into the device and which, in conjunction with the double partition wall 32, provide a firm support for the lid 38 even when used as a writing desk.

From the foregoing, it should be appreciated that a highly unique container has been defined, this container, through the particular construction thereof having a versatility and adaptability heretofore unknown in such devices, incorporating all of the advantages of a storage compartment, serving tray, and writing desk.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A seat mountable accessory comprising front and rear compartments, a common partition wall located therebetween and defining said compartments, said compartments opening upwardly, removable lid means selectively closing solely the rear compartment, the front compartment having food retaining means incorporated therein, a bottom within said compartments, said food retaining means comprising a platform positioned in spaced relation over the front compartment bottom, and at least one receptacle receiving opening defined in said platform, said rear compartment lid means being, in its closed position, inclined downwardly and forwardly toward the front compartment, said accessory including parallel laterally spaced side walls, a front wall extending between the forward ends of the side walls, a rear wall of greater height than said forward wall extending between the rear ends of the side walls, the bottom edges of said walls being substantially coplanar, the upper edges of the side walls being inclined upwardly from generally the upper edge of the front wall to the upper edge of the rear wall, said platform paralleling the bottom of the front compartment and being substantially coplanar with the upper edge of the front wall, said partition wall extending between and engaging the side walls, the upper edge of said partition wall being generally coplanar with the upper edges of the side walls at the point of engagement therewith, said lid means being, in its closed position, engaged with the upper edges of the side and partition walls, at least the walls of said accessory being constructed of reinforced cardboard, said rear wall having an integral tongue portion extending from the upper edge thereof, a flexible area defined at the juncture of the tongue and back wall, said lid means being intimately affixed to said tongue portion and thereby hingedly secured to the rear wall.

2. The device of claim 1 including slip-resistant means affixed to the bottom.

3. A seat mountable accessory comprising front and rear compartments, a common partition wall located therebetween and defining said compartments, said compartments opening upwardly, removable lid means selectively closing solely the rear compartment, the front compartment having food retaining means incorporated therein, said accessory including parallel laterally spaced side walls, a front wall extending between the forward ends of the side walls, a rear wall of greater height than said forward wall extending between the rear ends of the side walls, the bottom edges of said walls being substantially coplanar, the upper edges of the side walls being inclined upwardly from generally the upper edge of the front wall to the upper edge of the rear wall, at least the walls of said accessory being constructed of reinforced cardboard, said rear wall having an integral tongue portion extending from the upper edge thereof, a flexible area defined at the juncture of the tongue and back wall, said lid means being intimately affixed to said tongue portion and thereby hingedly secured to the rear wall.

References Cited by the Examiner

UNITED STATES PATENTS

| | | | |
|---|---|---|---|
| 1,293,400 | 2/1919 | Fuller | 312—281 X |
| 1,369,439 | 2/1921 | Johnson | 206—16 |
| 1,684,002 | 9/1928 | White | 206—16 |
| 2,971,572 | 2/1961 | Watkins | 297—194 |
| 2,986,438 | 5/1961 | Smathers | 108—116 |
| 3,083,998 | 4/1963 | Morris | 297—194 |

CLAUDE A. LE ROY, *Primary Examiner.*

CHANCELLOR E. HARRIS, *Examiner.*